United States Patent [19]
Liston

[11] 3,833,304
[45] Sept. 3, 1974

[54] SPECTROPHOTOMETER USING PLURAL FILTERS

[75] Inventor: Max D. Liston, Irvine, Calif.

[73] Assignee: Abbott Laboratories, Chicago, Ill.

[22] Filed: May 3, 1973

[21] Appl. No.: 357,064

Related U.S. Application Data

[60] Division of Ser. No. 133,081, April 12, 1971, Pat. No. 3,748,044, which is a continuation-in-part of Ser. No. 854,647, Sept. 2, 1969, Pat. No. 3,664,744.

[52] U.S. Cl................. 356/184, 356/188, 356/189
[51] Int. Cl.............................................. G01j 3/48
[58] Field of Search......... 356/39, 40, 41, 101, 180, 356/184, 186, 188, 189, 201, 204, 205; 250/218

[56] References Cited
UNITED STATES PATENTS

| | | | |
|---|---|---|---|
| 3,089,382 | 5/1963 | Hecht et al. | 356/188 |
| 3,247,758 | 4/1966 | Turner | 356/101 |
| 3,273,448 | 9/1966 | Kelly | 356/188 |
| 3,512,889 | 5/1970 | Liston | 356/180 |
| 3,528,749 | 9/1970 | Bowker | 356/204 |
| 3,684,378 | 8/1972 | Lord | 356/205 |

OTHER PUBLICATIONS
"Determining Only One Compound in a Mixture" Allen et al.; Analytical Chemistry; Vol. 25, No. 9, Sept. 1953; pages 1,325–1,331.

Primary Examiner—Vincent P. McGraw
Attorney, Agent, or Firm—Molinare, Allegretti, Newitt & Witcoff

[57] ABSTRACT

The disclosure describes apparatus for instantaneously determining the concentration of a predetermined substance that absorbs radiant energy within a predetermined band of wavelengths in the presence of other interfering substances that also absorb radiant energy in the region of the predetermined band. The determination is made by generating multiple wavelengths of radiant energy. The radiant energy is then sequentially transmitted in a single path through the substances, and the transmission is periodically interrupted by means which prevent the transmission of any radiation. The intensities of the radiant energy transmitted through the substances at the various wavelengths are then compared by electronic apparatus.

10 Claims, 9 Drawing Figures

SPECTROPHOTOMETER USING PLURAL FILTERS

RELATED APPLICATION

This application is a division of my application Ser. No. 133,081, filed Apr. 12, 1971 entitled "Digital Chemical Analysis Apparatus", now U.S. Pat. No. 3,748,044, which in turn is a continuation-in-part of my application Ser. No. 854,647, filed Sept. 2, 1969, entitled "LOG RATIO CIRCUIT FOR DOUBLE BEAM SPECTROPHOTOMETERS," now U.S. Pat. No. 3,664,744.

BACKGROUND OF THE INVENTION

1. Field of the Invention

This invention relates to chemical analysis apparatus, and more particularly relates to apparatus for determining the concentration of substances by radiant energy.

2. Description of the Prior Art Known to Applicant

In order to rapidly analyze the concentration of a particular substance present in a chemical specimen, such as blood, chemists are placing increasing reliance on various types of machines. Such machines devised in the past may be divided into at least the following types:

1. Blood gas analyzers;
2. Prothrombin time determining systems;
3. Flow systems;
4. Electromechanical methods not related to colorimetry; and
5. Monochromatic servomechanism systems.

Although such machines have somewhat reduced the labor involved in performing chemical analysis, they have exhibited many deficiencies that have limited their overall usefulness.

The known prior art machines are unable to compensate for substances in a specimen which tend to absorb some radiant energy in the same band of wavelengths as the substance under analysis. This is a most serious failing, because it produces significant inaccuracies in the results. Two of the best known methods of avoiding these inaccuracies are to physically separate the desires substance from the interfering substances, or to perform a so-called "Allen" correction. In many cases, the physical separation of the substance is almost impossible to achieve, and at best, it is a time-consuming and costly process. The Allen method of correction requires the set up of cumbersome laboratory equipment and the laborious hand calculation of values derived from the use of the equipment. Since this method is time-consuming, it cannot be used to make accurate corrections while the interfering substance and the desired substance are reacting.

Certain bichromatic systems which measure the difference in the absorbence of light transmitted through a specimen at different wavelengths have also been used in the past. One such system is described in U.S. Pat. No. 2,640,389 issued June 2, 1953 in the name of the applicant. Another such system is the Bilirubinometer manufactured by the American Optical Company, Keene, N.H. Although these systems perform many useful functions, their overall usefulness has been limited because they fail to provide a reference level against which the level of the bichromatic signals can be measured.

SUMMARY OF THE INVENTION

The applicant has invented unique apparatus for instantaneously determining the concentration of a predetermined substance that absorbs radiant energy within a predetermined band of wavelengths, even though the predetermined substance is in the presence of other interfering substances that absorb radiant energy in the region of the predetermined band. According to a principal feature of the apparatus, at least two different wavelengths of radiant energy are generated. For example, the first wavelength may lie substantially in the center of the predetermined band, and the second wavelength may lie substantially outside the predetermined band. Likewise, radiant energy may be generated at a first wavelength at which the absorption coefficients of the predetermined substance and an interfering substance are the same, and another wavelength at which the absorption coefficient of the substances are substantially identical. The wavelengths of radiant energy are then transmitted through the substances, preferably in sequence and along a single path. Moreover, the transmission of radiant energy is periodically interrupted by means which prevent the transmission of any radiation. This unique feature provides a reference level against which the transmitted radiation can be measured.

The intensities of radiant energy transmitted through the substances at the first and second wavelengths are instantaneously compared by electronic apparatus. By properly comparing the intensities, the absorbence of radiant energy by the other interfering substances is instantaneously compensated for without physically separating these substances from the predetermined substance. Thus, the concentration of the predetermined substance may be determined with a degree of speed and accuracy heretofore unattainable, and may even be accurately evaluated while the predetermined substance is involved in a chemical reaction. Moreover, this unique system automatically corrects for scattering media in the substances because radiation is scattered equally for all wavelengths by such media.

According to another preferred feature of the apparatus, three wavelengths of radiant energy are generated. The first wavelength lies substantially in the center of the predetermined band; the second wavelength is greater than the first wavelength and lies substantially outside the predetermined band; and the third wavelength is less than the first wavelength and lies substantially outside the predetermined band. The radiant energy at the three wavelengths is then sequentially transmitted through the substances along a single path and is compared as described previously. According to this feature, the transmission of radiant energy is also interrupted periodically in order to establish a reference level. By using the foregoing apparatus, the concentration of the predetermined substance is determined instantaneously with a degree of accuracy heretofore unattainable.

DESCRIPTION OF THE DRAWINGS

These and other advantages and features of the present invention will hereinafter appear for purposes of illustration, but not of limitation, in connection with the accompanying drawings, in which like numbers refer to like parts throughout, and in which.

DESCRIPTION OF THE PREFERRED EMBODIMENT

Referring to the drawings, a preferred system for analyzing chemical specimens made in accordance with the present invention basically comprises a cuvette assembly 30; a carrousel assembly 110, including a cycling assembly 168; a dispenser assembly 200; a probe assembly 212; analyzing apparatus 400; a console 506; a processing circuit 540; and a memory 562.

Figure 2:
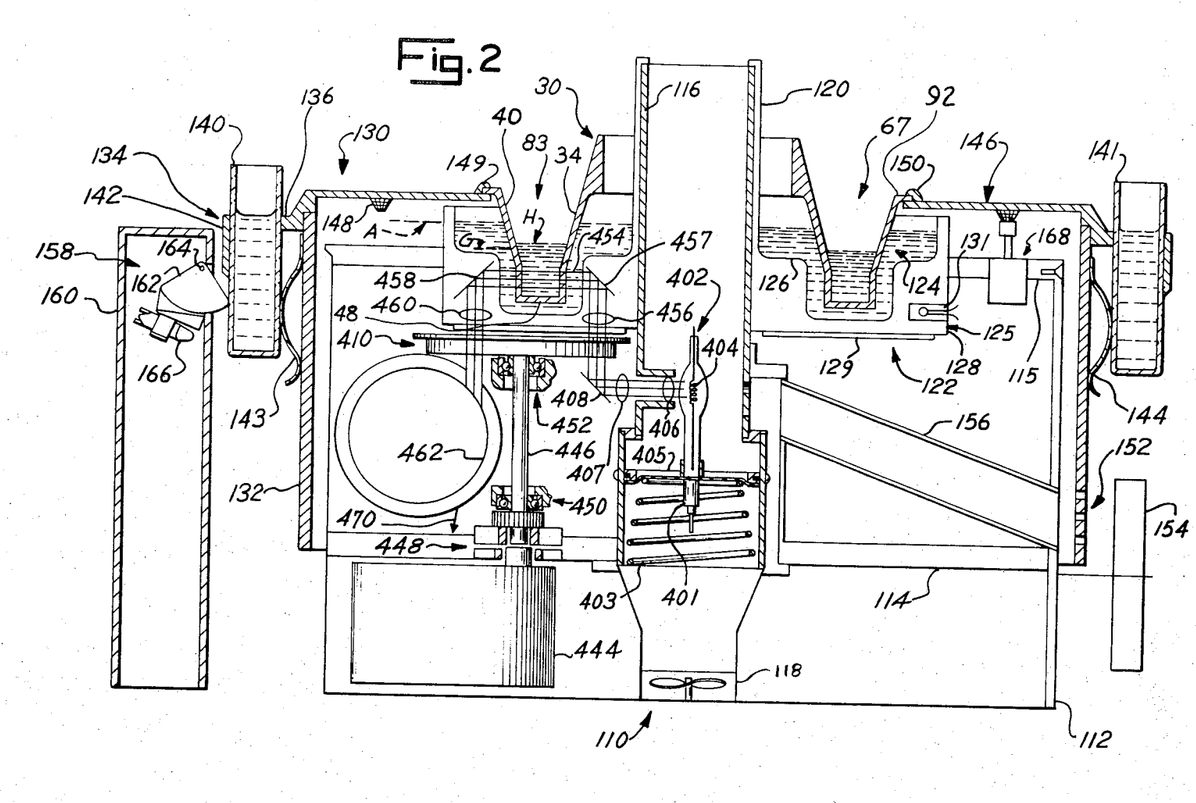
FIG. 2 is a cross-sectional, fragmentary, partially schematic view showing the cuvette assembly, carrousel assembly, cycling apparatus, positioning apparatus, and a portion of the analyzing apparatus of the preferred embodiment.

Referring to FIG. 2, cuvette assembly 30 comprises identical multiple compartments, such as compartments 67 and 83. Compartment 83 comprises a slanting, inner sidewall 34 and a slanting, outer sidewall 40. Spacers 58 are integrally formed with the sidewalls in a fluid-tight manner to form 32 separate compartments in cuvette 30.

Figure 1:
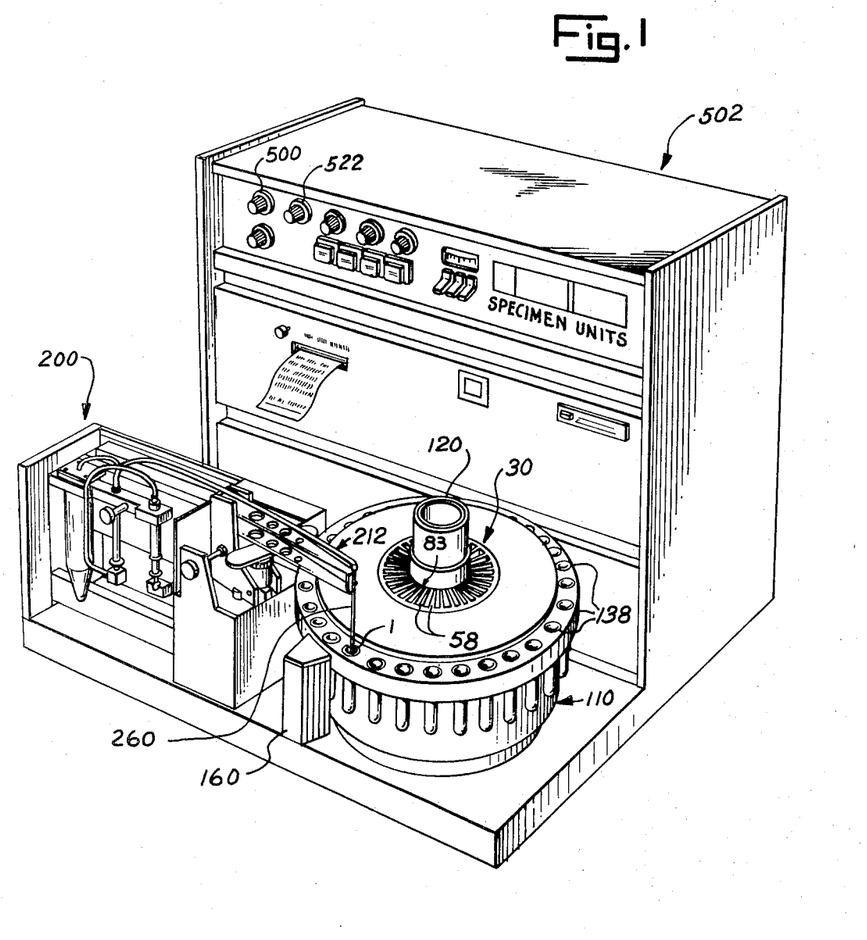
FIG. 1 is a perspective view of a preferred form of apparatus made in accordance with the present invention.

Referring to FIGS. 1 and 2, carrousel assembly 110 comprises a cylindrical base member 112 that supports platforms 114, 115. Platform 114 carries cylindrical support column 116 through which air is circulated by a fan 118 for cooling purposes. A cylindrical outer column 120 is carried by the top of column 116.

Figure 5:
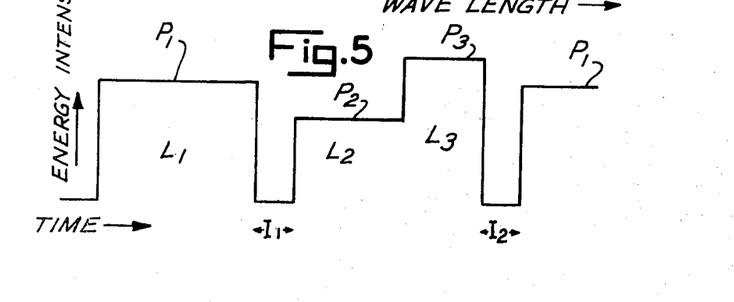
FIG. 5 illustrates the intensity of light transmitted by various sections of the filter shown in FIG. 3.

An incubator assembly 122 comprises a generally toroidal bath chamber 124 which is formed by a hollow receptacle 125 comprising a cylindrical inner wall 126 and a cylindrical outer wall 128. Wall 126 is integrally formed with column 120. Walls 126 and 128 are fabricated from a good thermal conducting material such as aluminum or copper. Windows that readily pass radiant energy in order to accommodate analyzing apparatus described hereafter are located in walls 126 and 128. Bath chamber 124 is filled with water to level A shown in FIG. 2. The water is heated to a predetermined temperature by a heater element 129, and the heater element is controlled by a thermistor 131 and a manually adjustable control switch (not shown). As shown in FIG. 5, the incubator is used in order to maintain the specimens held in the cuvette compartments at a predetermined temperature.

Still referring to FIGS. 1 and 2, assembly 110 is provided with a movable positioning platform 130 comprising a cylindrical skirt 132 and a ring-shaped test tube retainer 134. The retainer comprises a horizontal ring member 136 that is provided with holes for receiving 32 test tubes commonly designated by the number 138, including exemplary test tubes 140, 141. Each of the test tubes lies along a radius common to a corresponding cuvette compartment. The retainer also comprises a vertical ring-shaped retainer 142. According to the preferred embodiment of the invention, the test tubes are used to hold chemical samples prior to the time they are mixed with a suitable reagent to form a specimen for analysis. The tubes are biased against retainer 142 by resilient spring clips, such as exemplary clips 143, 144. The clips are mounted on skirt 132.

Positioning platform 130 also comprises a raised, ring-shaped portion 146 that carries on its underside a circular positioning member 148 bearing detents. Member 148 is provided with one detent opposite each test tube and corresponding cuvette compartment, so that each specimen may be accurately located in a predetermined analyzing position during the analysis procedure. The entire positioning platform is rotatably mounted on platform 115 by means not shown. The inner edges of platform 130 are fitted with guides, such as guides 149, 150, that comate with the notches of lip 92 of cuvette assembly 30. By using the guides, the cuvette assembly is precisely located on the platform and is rotatable therewith.

Cylindrical skirt 132 comprises 32 sets of five coded holes that are drilled adjacent a radial line extending from each cuvette compartment. Referring again to FIG. 2, light is transmitted through the coded holes to a plurality of stationary phototransistors 154 by a light pipe 156. As explained in more detail later, the coded holes are used to generate a binary identity code that uniquely identifies each test tube and corresponding cuvette compartments that is moved into the analyzing position. That is, each of the test tubes and corresponding cuvette compartments is identified by a different arrangement of coded holes which can be recognized and used to perform certain machine functions. The manner in which cells 154 are arranged in order to recognize the hole binary code is well-known to those skilled in the art.

As shown in FIG. 2, a test tube detection assembly 158 is held in a cabinet 160 that is located one position ahead of the analyzing position. The assembly comprises a pendulum 162 pivoted around a rod 164. The pendulum normally swings into the path of test tubes 138, and in that position, causes a mercury switch 166 to be closed. When a test tube is positioned opposite assembly 158, pendulum 162 is moved to the position shown in FIG. 2, thereby causing switch 166 to open. Assembly 158 operates so that the normal operation of the system is interrupted if no test tube is present at a particular position in ring member 136.

Cycling assembly 168 is used to sequentially advance the cuvette compartments into the path of an analyzing beam.

Analyzing Apparatus

Referring to FIGS. 2 and 3 – 5, analyzing apparatus 400 comprises generating apparatus including a light source 402 having a filament 404 that produces light throughout the visible and ultraviolet spectrum. The light source is held in a socket 401 by a spring 403 and an indexing plate 405. The light source supplies light to light pipe 156, to lenses 406, 407 that focus the light through a mirror 408 onto a ring-shaped filter 412 located on a disc 410, and to a commutator ring of disc 410. Disc 410 rotates about an axis 411 located in the center thereof.

Figure 3:
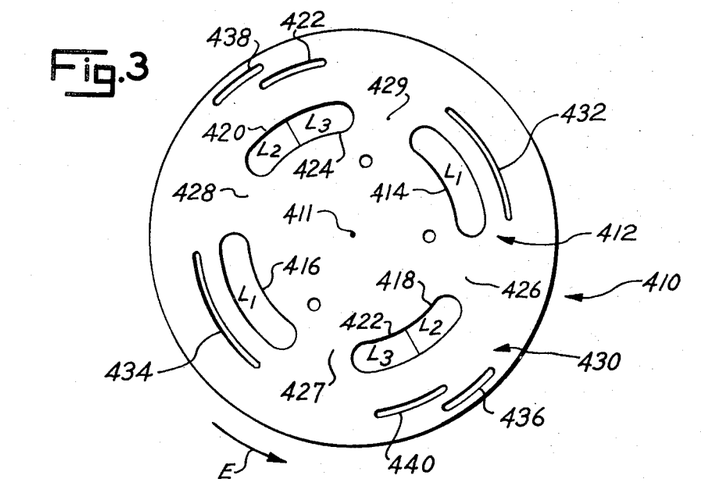
FIG. 3 is a top plan view of a preferred form of a light filter and commutator wheel used in connection with the analyzing apparatus.
Figure 4:
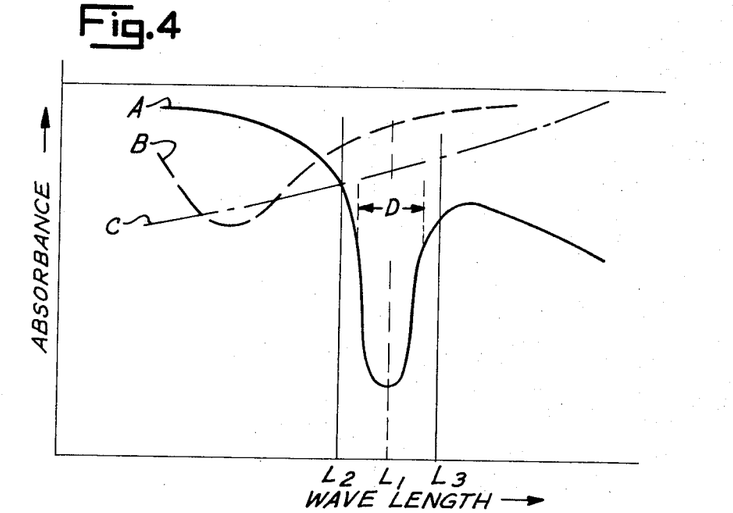
FIG. 4 is a graph showing the absorbence of radiant energy of various exemplary substances.

As best shown in FIG. 3, filter 412 comprises a pair of filter segments 414, 416 that are displaced from each other by 180° of arc. Segments 414, 416 are identical and transmit radiant energy only in the region of a particular wavelength L1. Filter 412 also comprises a pair of filter segments 418, 420 that are displaced from each other by 180° of arc. These filter segments are also identical and transmit radiant energy only in the region of another wavelength L2. Filter 412 further comprises a pair of filter segments 422, 424 that are displaced from each other by 180° of arc. Segments 422, 424 are identical and transmit radiant energy only in the region of a third wavelength L3. Those skilled in the art will recognize that the abovedescribed filter segments would normally be expected to transmit radiant energy in a narrow band of frequencies in the region of wavelengths of L1–L3. However, for purposes of clarity, they will be discussed in this specification as if they transmitted radiant energy only at the precise wavelengths L1–L3. Filter 412 is designed so that the wavelengths of radiant energy passed by one pair of filter segments are not passed by the other pairs of filter segments. Filter 412 also comprises opaque segments 426–429 that prevent the transmission of light and establish a zero radiation reference level.

In order to properly employ filter 412, wavelengths L1–L3 must be chosen according to the radiant energy absorbence characteristics of the particular substance being analyzed. The manner of choosing these wavelengths for the filter is schematically described in FIG. 4, wherein curve A represents the abosrbence characteristics of a substance being analyzed, and curves B and C represent the absorbence characteriscitc of other substances generally present in a specimen together with substance A.

Applicant has discovered that the difficulties normally encountered in the analysis of substance A due to the absorbence of substances B and C may be substantially eliminated by choosing wavelength L1 so that it lies substantially in the center of the absorbence band of substance A. Wavelength L2 is chosen so that it is less than L1 and lies substantially outside the absorbence band of substance A. Wavelength L3 is chosen so that it is greater than L1 and also lies substantially outside the absorbence band of substance A. Those skilled in the art will recognize that the absorbence band of substance A lies substantially in area D of FIG. 4.

Absorbence curves for most substances commonly analyzed are well-known, and can be obtained from the chemical literature. One skilled in the chemical arts can normally find the absorbence curve for the substance being analyzed, and can thereby determine the proper wavelengths L1–L3 with little difficulty. For example, if a chemist desires to make a total protein determination of a blood specimen, L1 would commonly be in the region of 545 nanometers, L2 would be approximately in the region of 500 nanometers, and L3 would be approximately in the region of 600 nanometers.

Applicant has also found that the use of multiple wavelengths of radiant energy reduces the effect of turbidity of a specimen, air bubbles entrained in the specimen, and optical imperfections of the cuvette.

In the bichromatic system, it is sometimes useful to choose L1 so that it lies at a wavelength at which the absorption coefficients of substances A and B are substantially different and to choose L2 so that it lies at a wavelength at which the absorption coefficients of substances A and B are substantially the same.

Returning to FIG. 3, disc 410 also comprises a commutation ring 430 that lies on disc 410 outside the region of filter 412. The commutation ring comprises a pair of slits 432, 434, that are opposite filter segments 414, 416 respectively, and which both lie on a common circle concentric with the axis 411. Commutation ring 430 also comprises a pair of slits 436, 438 that are located opposite filter segments 418, 420, respectively, and which lie on a common circle that is concentric with axis 411. Commutation ring 430 further comprises a pair of slits 440, 442 that are located opposite filter segments 422, 424, respectively, and which lie on a common circle that is concentric with axis 411. As shown in FIG. 3, each of the circles on which the slit pairs lie has a different radius, so that the slit pairs are radially displaced from each other.

Figure 8:
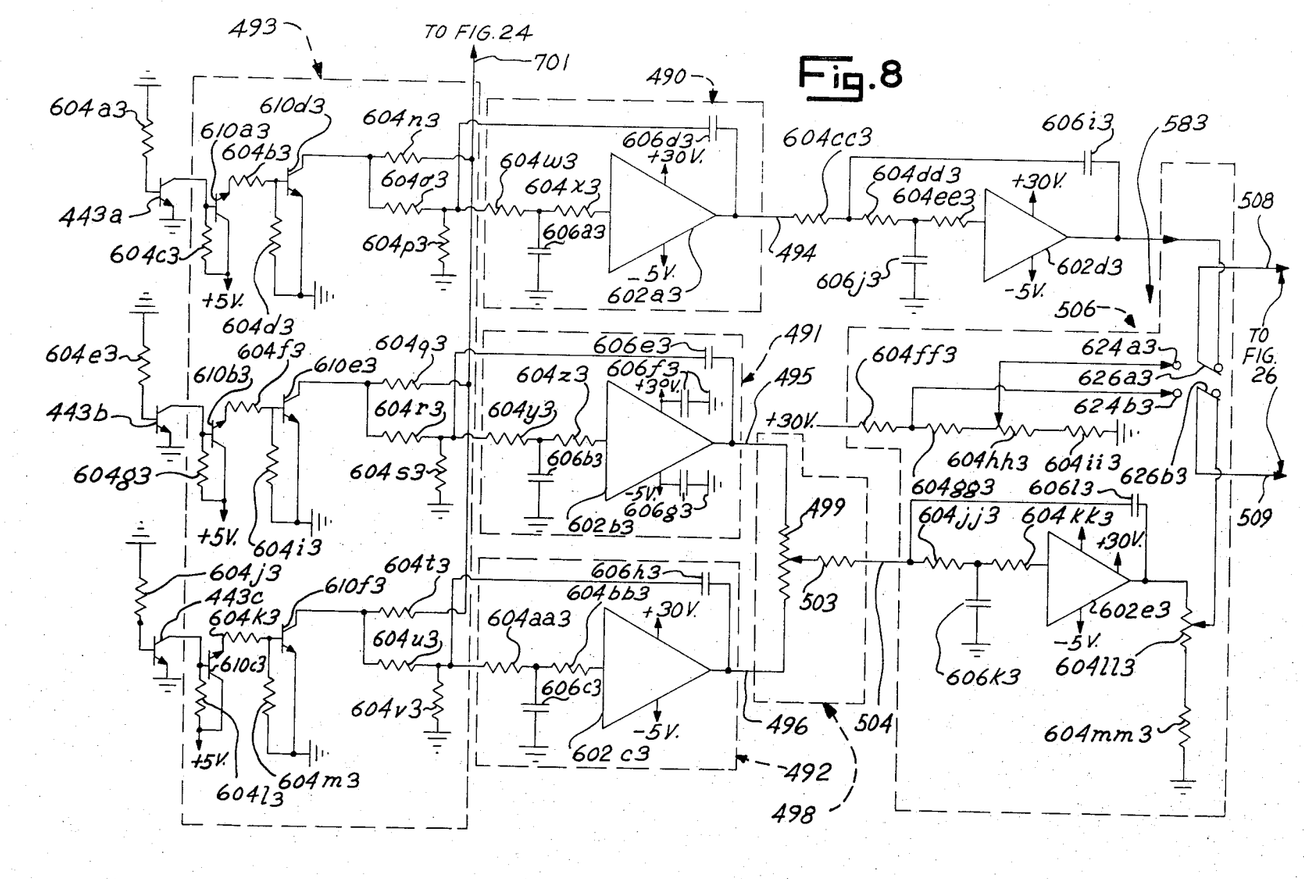
FIG. 8 is a schematic diagram illustrating a preferred form of detection circuit, filter, and summing circuit used in connection with the analyzing apparatus.

Light from source 402 shines upward through the slit pairs into three photoelectric transistors that are aligned with the circles on which various slit pairs lie. That is, each of the photoelectric transistors receives light through the slits in each pair, but does not receive light from an adjoining slit. More specifically, as shown in FIG. 8, a photoelectric transistor 443a is positioned to receive illumination through slits 432, 434; a photoelectric transistor 443b is positioned to receive illumination through slits 436, 438; and a photoelectric transistor 443c is positioned to receive illumination through slits 440, 442.

Disc 410 is rotated in the direction of arrow E (FIG. 3) by a motor-gear unit 444 (FIG. 2) that rotates a shaft 446 through a magnetic coupling 448 and bearings 450, 452. Unit 444 is geared to rotate disc 410 at about 1,800 rpm.

When filter 412 is being rotated, light from source 402 passes therethrough and generates beams of light along a single path 454. The beams of light comprise cyclical pulses of monochromatic light. A complete cycle of light pulses is shown in FIG. 5 as pulses P1, P2 and P3. It should be noted that pulse P1 is separated from pulse P2 by an interval I1 which is formed by segment 426 or 428 of the filter. Likewise, pulse P3 is separted from pulse P1 in each cycle by an interval I2 that is formed by segment 427 or 429 of the filter.

The monochromatic light pulses generated by the filter and source 402 in a single path pass through each specimen to be analyzed. For example, if compartment 83 of cuvette 30 is located in the analyzing position shown in FIG. 2, the pulses are passed through a lens 456, reflected from a mirror 457, and transmitted through the incubator bath chamber 124. The pulses thereafter pass through planar portion 98 of cuvette 30, the specimen in compartment 83, planar portion 100, bath chamber 124, a mirror 458, and another lens 460 that focuses the resulting transmitted pulses onto a portion of filter 412 that is 180° displaced from the portion of the filter which produced the pulses. Since corresponding identical segments of the filter are displaced by 180° of arc, each pulse is filtered by identical filters before it enters the specimen and after it leaves the specimen. This arrangement provides a means for correcting the radiation transmitted through the specimen. For example, each photon of light passing through segment 414 also passes through corresponding segment 416. As a result, aberrant wavelengths of light which may have been picked up during the travel of the pulses through the specimen are removed, thereby avoiding one possible source of error in the analysis of the specimen. As stated in my U.S. Pat. No. 3,512,889, filtering a light beam both before and after it is transmitted through the specimen enables the system to be used in ambient light conditions.

After the pulses transmitted from the specimen pass through filter 412, they are transmitted into a photomultiplier transducer tube 462 that sequentially produces electrical pulse signals having values proportional to the intensity of the light transmitted through the specimen at each of wavelengths L1–L3. That is, tube 462 produces on its output conductor 470, electrical pulse signals having voltage waveforms corresponding to pulses P1–P3 in each cycle.

Figure 6:
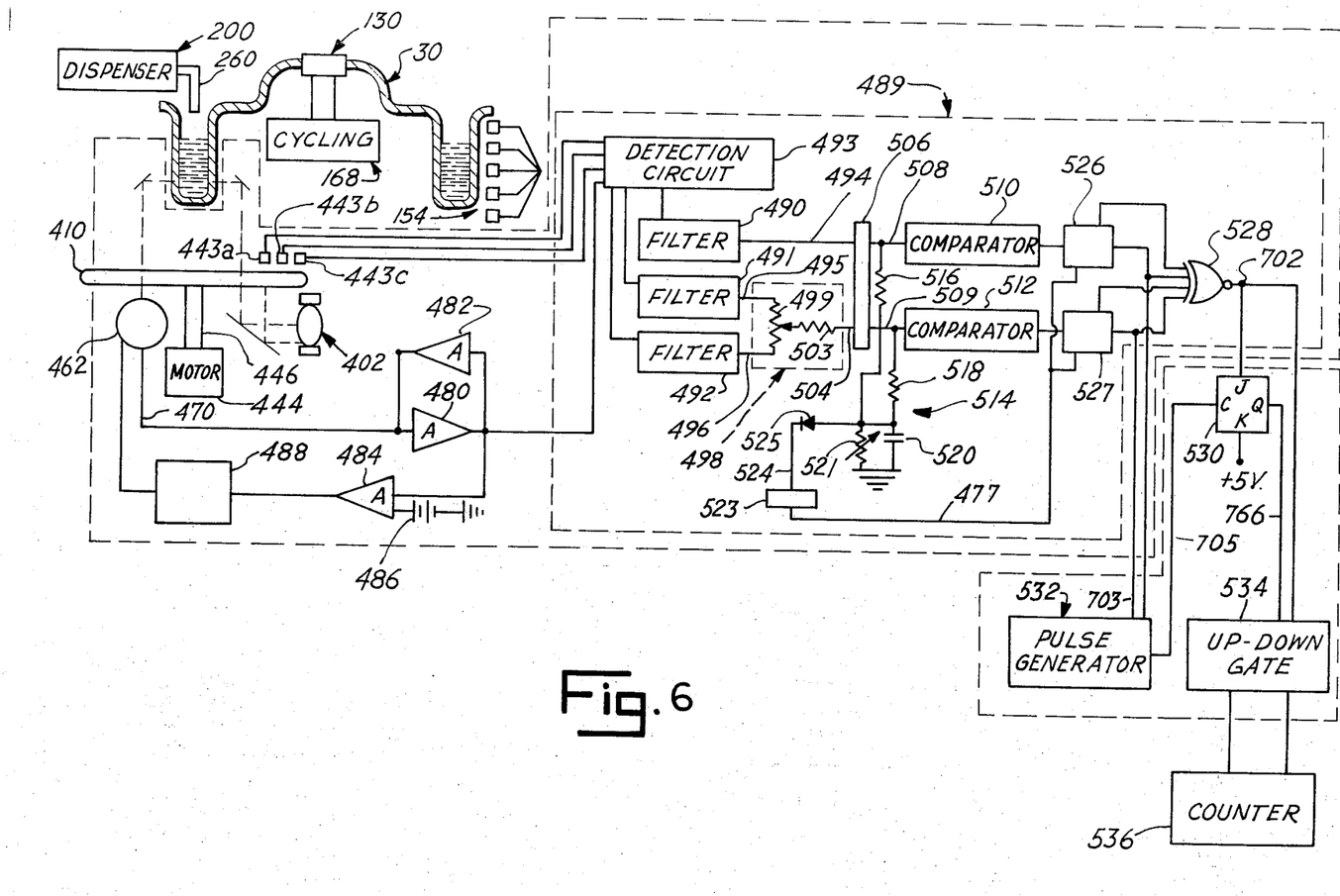
FIG. 6 is a schematic block diagram of a preferred system made in accordance with the present invention.

Electronic apparatus for analyzing the electric pulse signals produced by photomultiplier 462, together with additional processing circuits for controlling the operation of the entire system, are schematically shown in FIG. 6. More specifically, the pulse signals generated on conductor 470 are amplified by a signal amplifier 480 that is controlled by a bias amplifier 482. The output of signal amplifier 480 is also connected to one input of a servoamplifier 484. Another input to the servoamplifier is provided by a reference voltage supply 486. Servoamplifier 484 compares the signals from the amplifier 480 and the reference voltage supply in order to control the output of a servo-high voltage supply 488 that is connected to a photomultiplier 462. If the signals produced on the output of amplifier 480 become sufficiently weak, high voltage supply 488 is altered so that photomultiplier 462 increases the magnitude of the signals appearing on conductor 470.

The output of amplifier 480 is also conducted to a comparison circuit 489 comprising low pass filters 490–492. The inputs of these filters are connected through a detection circuit 493 to photo transistors 443a–443c. The detection circuit receives information signals from transistors 443a–443c so that filters 490–492 are enabled to pass electric pulse signals corresponding to only one of light pulses P1–P3. More specifically, detection circuit 493 enables filter 490 to conduct a pulse signal to conductor 494 only during the duration of light pulse P1. Likewise, filters 491 and 492 are enabled to conduct pulse signals to conductors 495 and 496 only during the duration of light pulses P2 and P3 respectively. As a result, D.C. signals are produced on conductors 494–496 having magnitudes proportional to the intensity of light pulses P1–P3, respectively. The D.C. signals on conductors 495 and 496 are transmitted to a summing circuit 498 comprising an adjustable potentiometer 499 that is controlled by a knob 500 located on console 502 (FIG. 1). Circuit 498 also comprises a biasing resistor 503 through which a predetermined proportion of the summed values of the signals on conductors 495, 496 is transmitted to a conductor 504. Conductors 494 and 504 are connected through an adjustment circuit 506 to conductors 508, 509, respectively.

The D.C. voltages appearing on conductors 508 and 509 are conducted to a log ratio meter more fully described in my U.S. Pat. No. 3,664,744. The log ratio meter comprises comparators 510 and 512. The voltage from a resistive-capacitive timing circuit 514 is also applied to the comparators. Timing circuit 514 comprises fixed resistors 516, 518, and a fixed capacitor 520. The circuit also comprises an adjustable potentiometer 521 that is controlled by a knob 522 located on console 502 (FIG. 1). Means 523 described hereafter are provided for applying charging pulses along a conductor 524 and through a diode 525 to capacitor 520 in order to charge the capacitor to a predetermined negative voltage. The negative voltage is sufficiently large so that conductors 508 and 509 are biased below ground potential for the duration of the charging pulse. When the charging pulse is terminated, the voltage on the conductors varies monotonically. More specifically, it begins to exponentially decay toward ground potential. Generally, conductor 509 reaches ground potential before conductor 508. As soon as conductor 509 reaches ground potential, comparator 512 generates a pulse which switches flip-flop circuit 527 to its 1 state, thereby causing an exclusive OR gate 528 to initiate an analysis signal. The analysis signal is automatically converted to digital form by a converter circuit 529 comprising a flip-flop circuit 530, a crystal controlled pulse generator 532 that produces pulses at a rate of 200 KC, and an up-down gate 534. The initiation of the analysis signal also switches flip-flop 530 to its 1 state so that pulses from generator 532 are transmitted through up-down gate 534 and are counted by a counter 536. When conductor 508 reaches ground potential, comparator 510 generates a pulse which switches a flip-flop circuit 526 to its 1 state, so that gate 528 is returned to its original state, thereby terminating the analysis signal. This prevents any additional pulses from entering counter 536.

It will be appreciated that the duration of the analysis signal is proportional to the concentration of substance A in the specimen being analyzed.

Moreover, by using the above-described circuitry, the number of pulses counted by counter 536 equals log (JP2+KP3)/LP1, where P1, P2 and P3 represent the magnitude of pulses P1, P2 and P3, respectively. With the proper selection of the J, K and L constants, the output can be made to read directly in desired units, such as mg per liter or international activity units. By using the circuitry, interfering substances B and C are automatically compensated for without physically separating them from substance A. Moreover, since the specimens are analyzed instantaneously, the compensation can be achieved while substance A is reacting.

Figure 7:
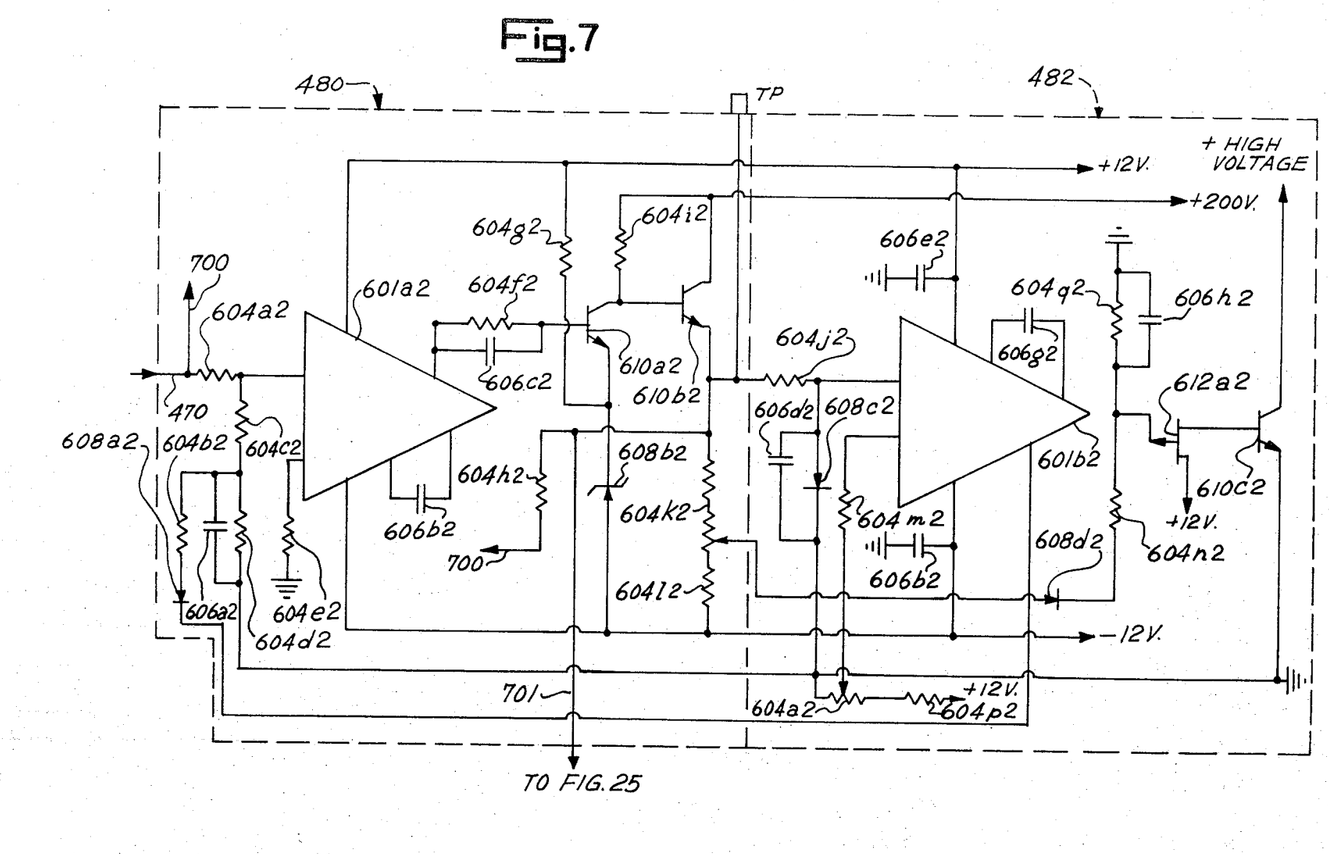
FIG. 7 is a schematic drawing of a preferred form of amplifier used in connection with the analyzing apparatus.
Figure 9:
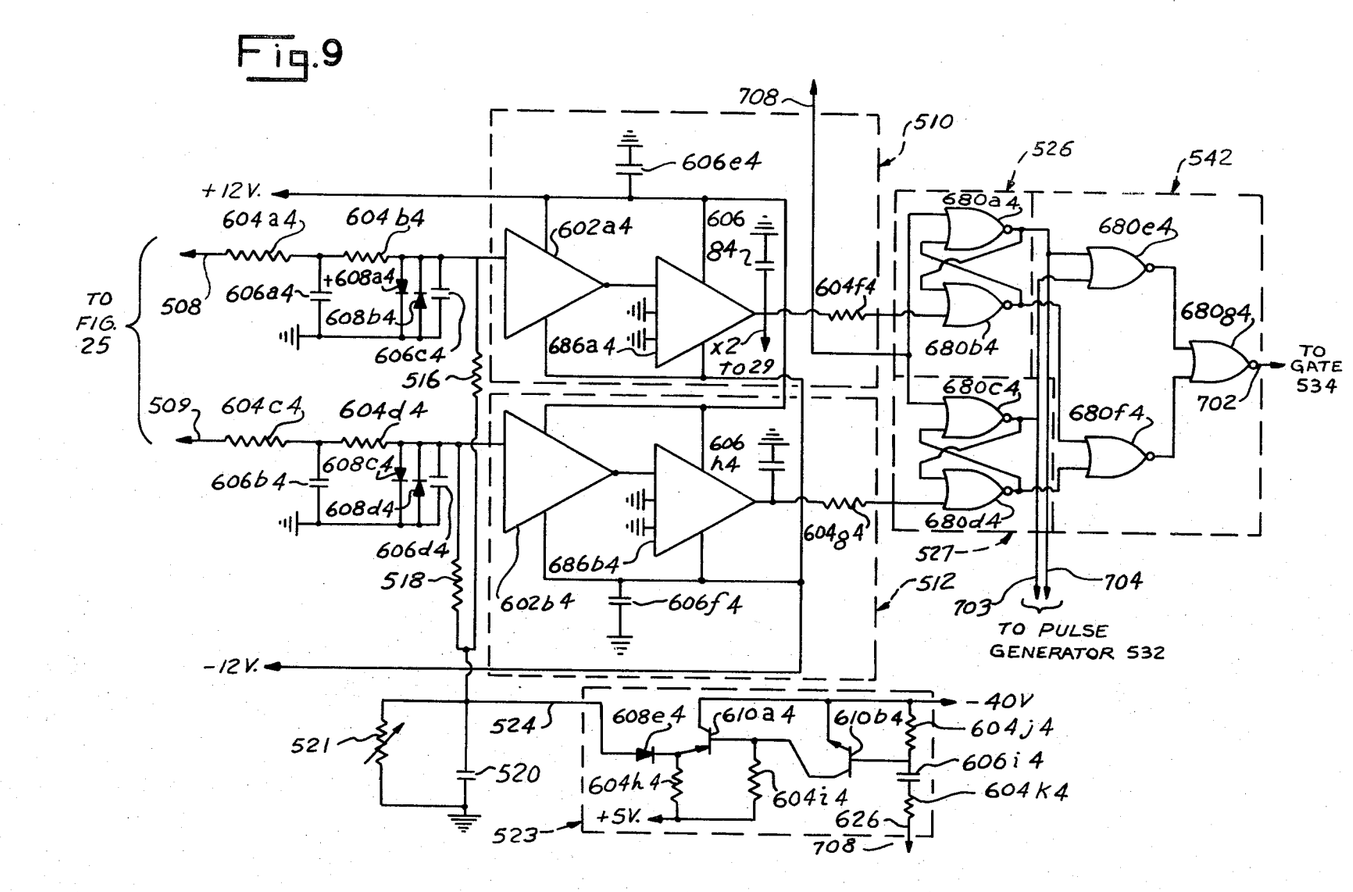
FIG. 9 is a schematic diagram illustrating a preferred form of comparator and gate apparatus used in connection with the analyzing apparatus.

A detailed description of a preferred embodiment of analyzing apparatus 400 is found in FIGS. 7 – 9. In each of FIGS. 7 – 9, the reference numbers are used to identify components of the type described in the following Table A:

TABLE A

| Reference Number | Type of Component |
|---|---|
| 604 | resistor |
| 606 | capacitor |
| 608 | diode |
| 609 | solenoid winding |
| 610 | junction transistor |
| 611 | thyristor |
| 612 | field-effect transistor |
| 616 | triac |
| 624 | switch contact |
| 626 | switch wiper |

In FIGS. 6 – 9, other reference numbers are used to identify components described as follows in Table B:

TABLE B

| Reference Number | Type of Component | Manufacturer | Part or Model No. |
|---|---|---|---|
| 601 | bias amplifier | National Semi-conductor Corp. | LM–301 |
| 602 | filter | National Semi-conductor Corp. | LM–302 |
| 614 | Hex-inverter | Texas Instruments, Inc. | 7404 |
| 636 | counter module | National Semi-conductor Corp. | 8560 |
| B636 | counter module | Signetics Corp. | 8292 |
| C636 | counter module | Signetics Corp. | 8293 |
| 637 | NAND gate | Signetics Corp. | 337 |
| 644 | memory module | Intel Corp. | 3101 |
| 656 | NAND gate | Signetics Corp. | 356 |
| 670 | NOR gate | Signetics Corp. | 370 |
| 677 | NAND gate | Signetics Corp. | 377 |
| 680 | NOR gate | Signetics Corp. | 380 |
| 684 | OR gate | Signetics Corp. | 384 |
| 686 | unity gain amplifier | National Semi-conductor Corp. | 310 |
| 687 | NAND gate | Signetics Corp. | 387 |

In addition, in FIGS. 7 – 9, conductors are indicated by numbers from 700–799. Like-numbered conductors are connected together.

The NAND, NOR and OR gates shown in the drawings are conventional logic gates that produce one or two voltage levels at their output terminals in response to voltage transmitted to their input terminals. When switched to their one state, the gates produce a relatively high voltage at their output terminals, and when switched to their zero state, the gates produce a relatively low voltage at their output terminals.

Referring to the conductors marked 708 in FIG. 9, these conductors are connected to a gating circuit which provides pulses that enable circuit 523 to charge capacitor 520. An exemplary gating circuit is shown in the above-described Related Application Ser. No. 133,081 which is incorporated by reference.

Those skilled in the art will appreciate that the specific embodiments described herein may be altered and changed by those skilled in the art without departing from the true spirit and scope of the invention which is defined in the appended claims.

What is claimed is:

1. Apparatus for automatically determining the concentration of an unknown substance that absorbs radiant energy within a predetermined band of wavelengths in the presence of other interfering substances that absorb radiant energy in the region of the predetermined band, comprising in combination:

a source of radiant energy;

optical means for transmitting a beam of radiant energy along a single path through the substances;

first filter means for transmitting a first radiant energy pulse at a first wavelength at which the absorption coefficients of the unknown substance and the interfering substances are substantially different;

second filter means identical to the first filter means;

third filter means for transmitting a second radiant energy pulse at a second wavelength at which the absorption coefficients of the unknown substance and at least one of the interfering substances are substantially the same;

fourth filter means identical to the third filter means;

rotational means for simultaneously rotating the first, second, third and fourth filter means so that at a first instant in time the beam is intersected by the first filter means at a first point along the path, by the second filter means at a second point along the path, and by the substances at a third point along the path between the first and second points and so that at a second instant in time the beam is intersected by the third filter means at the first point, by the fourth filter means at the second point and by the substances at the third point;

transducer means for producing a plurality of electrical pulse signals, each of the electrical pulse signals corresponding to a predetermined one of the radiant energy pulses transmitted through the substances;

synchronous detection means for separating the electrical pulse signals that correspond to radiant energy pulses having different wavelengths;

means for periodically preventing the transmission of radiant energy through the substances so that a reference level is established; and electronic comparison means for comparing the electrical pulse signals to produce an analysis signal having a value that is proportional to a property of the predetermined substance.

2. Apparatus, as claimed in claim 1, wherein the transducer means produces a first electrical pulse signal having a first value proportional to the intensity of said first radiant energy pulse received by a transducer means and a second electrical pulse signal having a second value proportional to the intensity of said second radiant energy pulse received by the transducer means, and wherein the electronic comparison means produces an analysis signal having a value proportional to the logarithm of the ratio of the first value and the second value.

3. Apparatus, as claimed in claim 1, and further comprising:
a disk rotatable around an axis for rotation;
means for locating the first and second filter means on opposite sides of the disk along a first radian of the disk;
means for locating the third and fourth filter means on opposite sides of the disk along a second radian of the disk; and
means for rotating the disk.

4. Apparatus, as claimed in claim 3, wherein the means for periodically preventing comprises opaque segments of the disk separating the first, second, third and fourth filter means.

5. Apparatus for automatically determining the concentration of an unknown substance that absorbs radiant energy within a predetermined band of wavelengths in the presence of other interfering substances that absorb radiant energy in the region of the predetermined band, comprising in combination:
generating means for generating and transmitting along a single path through the substances a first radiant energy pulse having a first wavelength substantially in the center of the energy absorption band of the predetermined substance, a second radiant energy pulse having a second wavelength that is less than the first wavelength and that is substantially outside the energy absorption band of the predetermined substance, and a third radiant energy pulse having a third wavelength that is greater than the first wavelength and that is substantially outside the energy absorption band of the predetermined substance;
transducer means for producing first, second, and third electrical pulse signals corresponding respectively to said first, second, and third radiant energy pulses;
first synchronous detection means for producing on a first conductor a first detected signal corresponding to said first electrical pulse signal;
second synchronous detection means for producing on a second conductor a second detected signal corresponding to said second electrical pulse signal;
third synchronous detection means for producing on a third conductor a third detected signal corresponding to the third electrical pulse signal;
means for periodically preventing the transmission of radiant energy through the substances so that a reference level is established;
first electrical filtering means for producing a first D.C. signal having a magnitude proportional to the amplitude of the first detected signal;
second electrical filtering means for producing a second D.C. signal having a magnitude proportional to the amplitude of the second detected signal;
third electrical filtering means for producing a third D.C. signal having a magnitude proportional to the amplitude of the third detected signal;
summing means for producing a summed signal proportional to the sum of the second and third D.C. signals;
timing means for generating a timing signal that varies monotomically;
first comparator means for producing a first resultant signal when the first D.C. signal and the timing signal have a predetermined relationship;
second comparator means for producing a second resultant signal when the summed signal and the timing signal have a predetermined relationship; and gate means for initiating the production of the analysis signal upon receipt of one of the resultant signals and for terminating production of the analysis signal upon receipt of the other resultant signal, said analysis signal having a value proportional to the logarithm of the ratio of the first D.C. signal and the summed signal.

6. Apparatus, as claimed in claim 5, wherein said first detection means comprises:
a gate circuit for shunting the signal appearing on the first conductor in response to a gate signal; and
commutator means for producing a gate signal except during the generation of the first pulse.

7. Apparatus, as claimed in claim 5, wherein said first, second and third filtering means each comprise a low pass filter.

8. Apparatus, as claimed in claim 5, wherein said timing means comprises a resistive, capacitive circuit that generates a signal which varies exponentially.

9. Apparatus, as claimed in claim 5, wherein said first comparator means produces a resultant signal when the sum of the timing signal and the first D.C. signal equals zero.

10. Apparatus, as claimed in claim 5, wherein said gate means comprises:
first flip-flop means connected to the first comparator means;
second flip-flop means connected to the second comparator means; and
an exclusive OR gate connected to the first and second flip-flop means.

* * * * *